(12) United States Patent
Matsuura et al.

(10) Patent No.: US 11,148,513 B2
(45) Date of Patent: Oct. 19, 2021

(54) WEATHER STRIP

(71) Applicant: NISHIKAWA RUBBER CO., LTD., Hiroshima-Ken (JP)

(72) Inventors: Toshifumi Matsuura, Hiroshima-Ken (JP); Hiroshi Suzuki, Hiroshima-Ken (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 39 days.

(21) Appl. No.: 16/599,639

(22) Filed: Oct. 11, 2019

(65) Prior Publication Data
US 2020/0114744 A1    Apr. 16, 2020

(30) Foreign Application Priority Data
Oct. 11, 2018   (JP) .............................. JP2018-192361

(51) Int. Cl.
| | | |
|---|---|---|
| *E06B 7/16* | (2006.01) | |
| *B60J 10/21* | (2016.01) | |
| *B60J 10/36* | (2016.01) | |
| *B60J 10/86* | (2016.01) | |
| B60J 10/27 | (2016.01) | |
| B60J 10/24 | (2016.01) | |

(52) U.S. Cl.
CPC .............. *B60J 10/21* (2016.02); *B60J 10/36* (2016.02); *B60J 10/86* (2016.02); *B60J 10/24* (2016.02); *B60J 10/27* (2016.02)

(58) Field of Classification Search
CPC ... B60J 10/21; B60J 10/36; B60J 10/86; B60J 10/27; B60J 10/24; B60J 10/78; B60J 10/18; B60J 10/80
USPC .................................. 49/498.1, 479.1, 492.1
See application file for complete search history.

(56) References Cited

U.S. PATENT DOCUMENTS

| | | | | |
|---|---|---|---|---|
| 8,181,397 | B2 * | 5/2012 | Daio | ........................ B60J 10/74 49/492.1 |
| 8,640,385 | B2 * | 2/2014 | Sawatani | ................ B60R 13/04 49/492.1 |
| 8,646,213 | B2 * | 2/2014 | Suzuki | ..................... B60J 10/78 49/479.1 |
| 9,387,744 | B2 * | 7/2016 | Grandgirard | ............ B60J 1/008 |
| 2005/0144849 | A1 * | 7/2005 | Boutin | ..................... B60J 10/32 49/490.1 |
| 2009/0007498 | A1 | 1/2009 | Araki et al. | |

FOREIGN PATENT DOCUMENTS

| | | |
|---|---|---|
| JP | 7-266879 A | 10/1995 |
| JP | 4976935 B2 | 7/2012 |

* cited by examiner

*Primary Examiner* — Jerry E Redman
(74) *Attorney, Agent, or Firm* — DLA Piper LLP (US)

(57) ABSTRACT

A weather strip made of an elastic material includes an insert member having a plurality of through holes which is embedded in a corner portion of the weather strip. In the corner portion, a clip insertion hole in which a clip for attaching the corner portion to the automobile body is insertable is formed, and in the insert member, a clip hole is formed in a position corresponding to the clip insertion hole. In the outer peripheral portion of the clip hole, an additional hole communicating with the clip hole is formed, and the elastic materials of which the corner portion is made and that are situated on the obverse and reverse sides of the insert member are united together through the additional hole.

4 Claims, 4 Drawing Sheets

[FIG. 1]
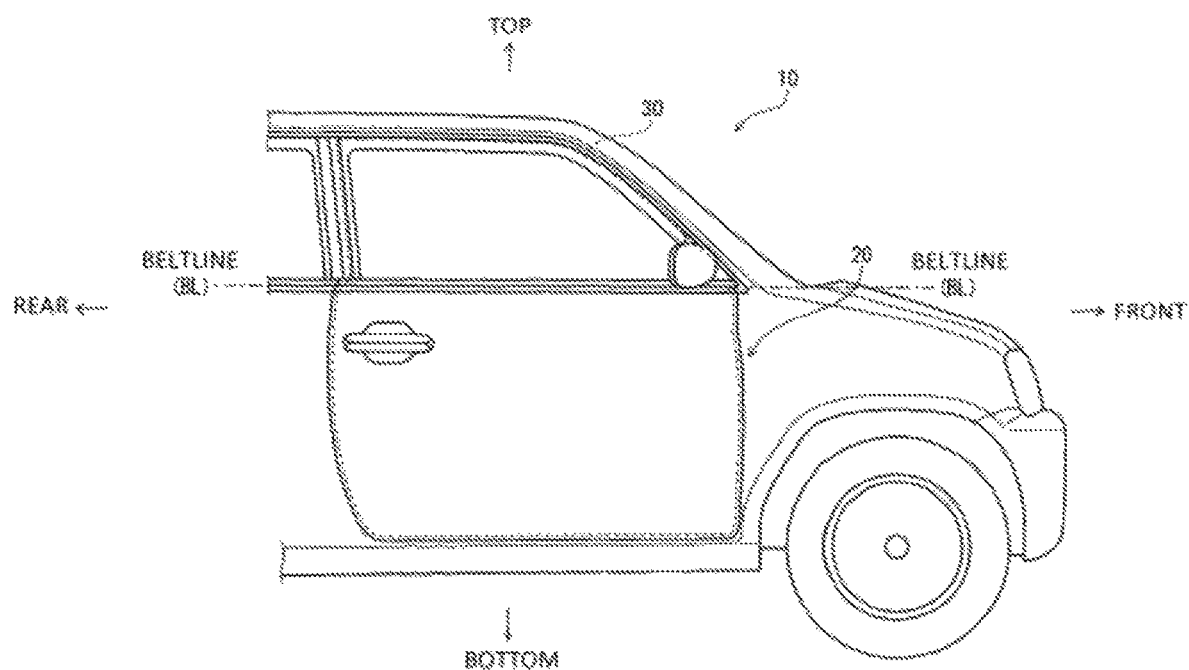

[FIG. 2]
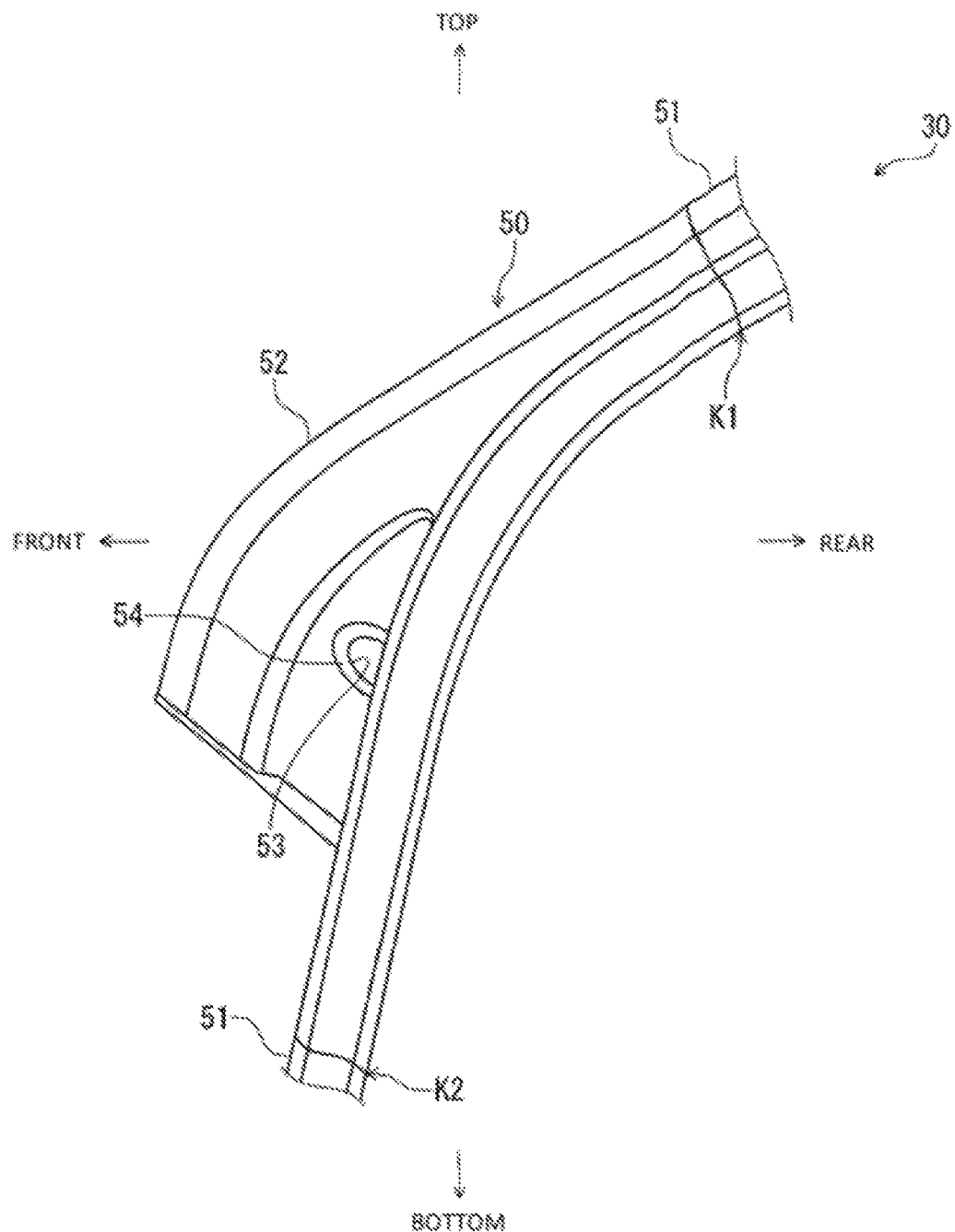

[FIG. 3]
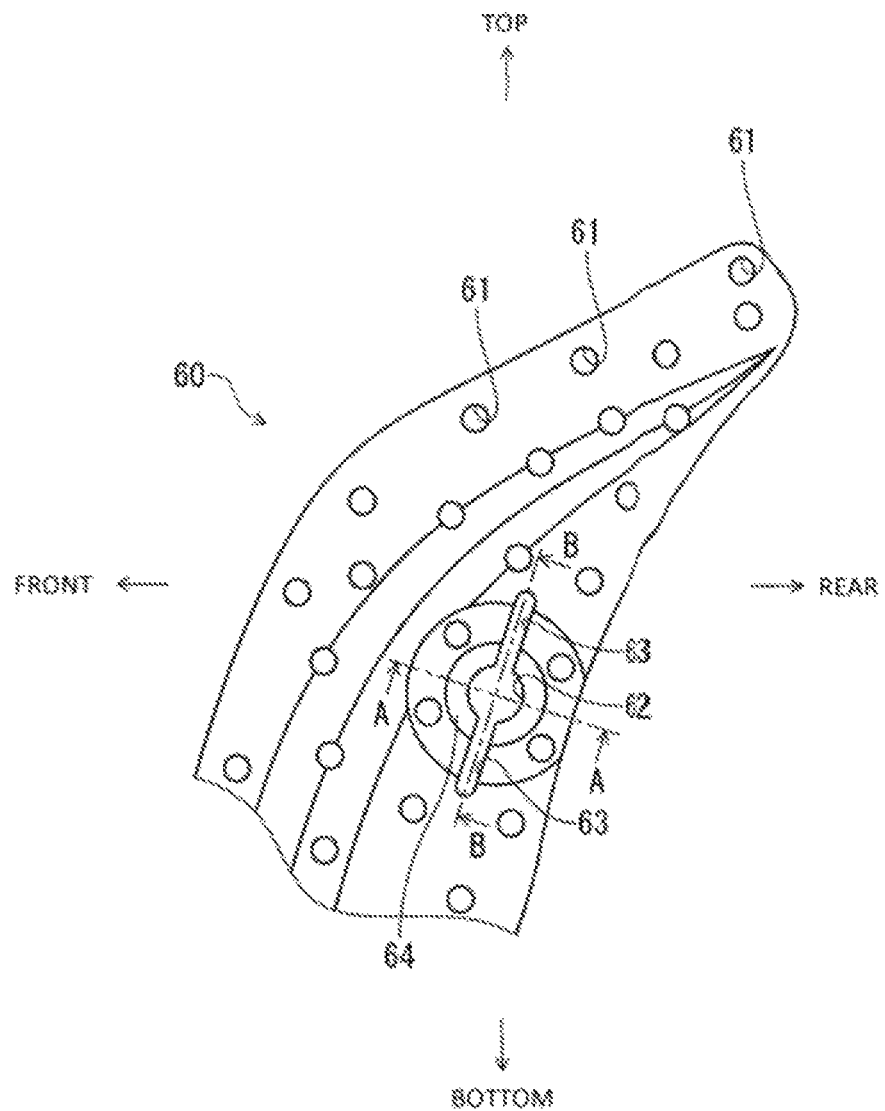

[FIG. 4]
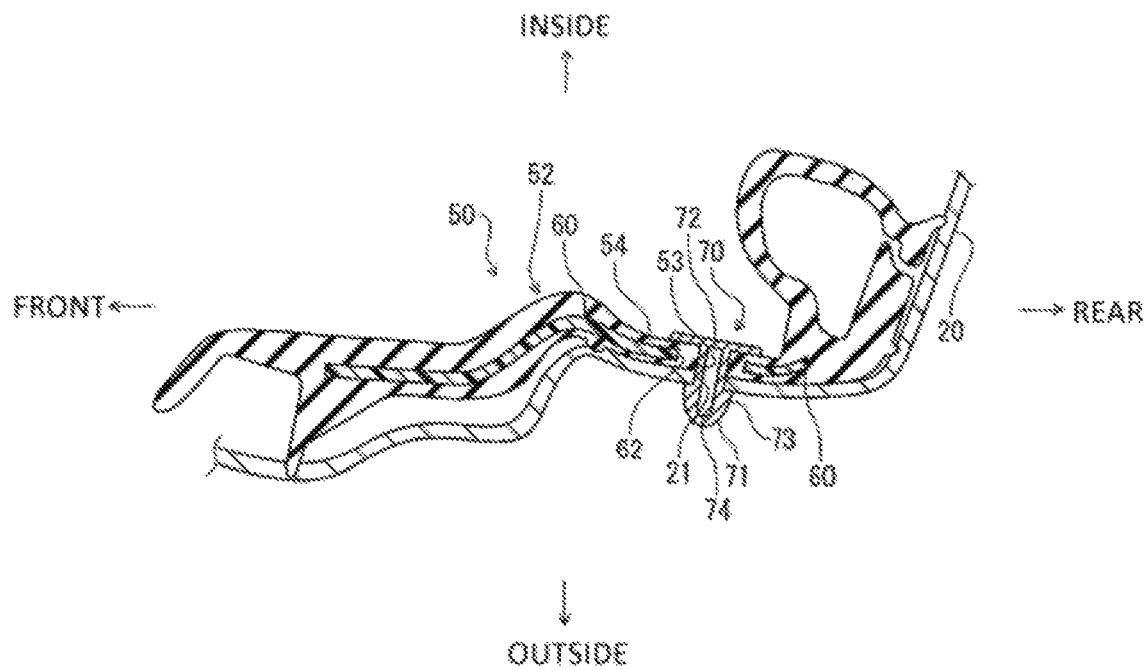
[FIG. 5]
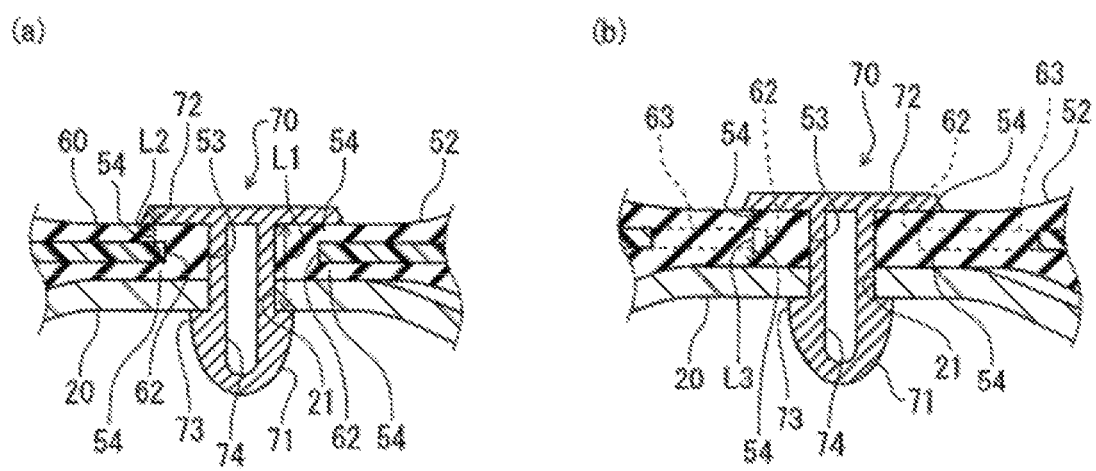

WEATHER STRIP

CROSS-REFFERENCE TO RELATED APPLICATION

This application claims priority to Japanese Patent Application No. 2018-192361 filed on Oct. 11, 2018, the entire disclosure of which is incorporated by reference herein.

BACKGROUND ART

The present disclosure relates to a weather strip for automobiles, and more particularly, relates to a weather strip embedded with an insert member.

Conventionally, automobiles have been provided with a weather strip made of an elastic body such as rubber or a resin for sealing between the peripheral edge of the door and the peripheral edge of the opening of the automobile body opened and closed by the door. The weather strip which is formed in a shape substantially along the shape of the door has linear parts (straight portions) and a corner part (corner portion). Normally, the straight portions of the weather strip are formed by extrusion molding, the corner portion is formed by molding with a metal mold (injection molding), and the end portion of the corner portion is united to the end portions of the straight portions to complete the weather strip.

In the corner portion where it is also necessary to set a core loophole because it is formed by molding with a metal mold, a part with insufficient stiffness occurs in a part of the shape more frequently than in the straight portions. For this reason, in the corner portion, an insert member made of a hard resin material is sometimes embedded for reinforcement. The insert member is previously embedded in a hollow portion of the metal mold for forming the corner portion, and is embedded in the corner portion by introducing an elastic material such as rubber or a resin into the hollow portion thereafter to form the corner portions.

Since the weather strip is normally attached to the automobile body such as a door panel and the like by using clips, the weather strip is provided with through holes for inserting clips, and in the corner portion embedded with the insert member, through holes for clips are also provided in the insert member. Japanese Patent Publication No. 4976935 discloses an insert member having introduction through holes as through holes for clips and through grooves communicating therewith and extending in the direction of the length of the insert member (see FIG. 2 of Japanese Patent Publication No. 4976935). In Japanese Patent Publication No. 4976935, the clips each have an end side locking portion inserted into the through holes provided in the weather strip, the insert and the automobile body such as the door panel and a base side locking portion on the opposite side. The base side locking portion has a head portion, a neck portion and a flange portion in this order from the base side, and only the neck portion has a diameter smaller than the width of the through grooves. Therefore, after the clip is inserted in the introduction through hole, the neck portion can be slid along the through groove. By doing this, the insert member is sandwiched between the head portion and the flange portion, and as a result, the clip is fixed so as not to fall off (see FIGS. 5 and 6 of Japanese Patent Publication No. 4976935).

Moreover, like the insert member of Japanese Patent Publication No. 4976935, a plurality of small-diameter through holes have conventionally been provided in addition to the through holes for clips (see FIG. 2 of Japanese Patent Publication No. 4976935). In the part of the weather strip where the insert member is disposed, the elastic material on the obverse surface side of the weather strip and the elastic material on the reverse surface side thereof are separated from each other by the insert member, so that there is a possibility that the insert member comes off inside the weather strip. Accordingly, a plurality of through holes are provided in the insert member so that the elastic material on the obverse side of the corner portion and the elastic material on the reverse side thereof can unite together through the through holes, thereby preventing the elastic material from coming off from the insert member.

As a conventional insert member, in addition to Japanese Patent Publication No. 4976935, Japanese Laid-Open Patent Publication No. H07-266879 discloses, as shown in FIGS. 4, 5 and 6 thereof, an insert member where the inner diameter of the clip hole of the insert panel (insert member) is substantially larger than the clip outer diameter and on the inner diameter, at least three small projections the diameter of an inscribed circle passing the tips of which is substantially equal to the clip outer diameter are provided.

In the weather strip including the insert member shown in Japanese Patent Publication No. 4976935 described above, when the core material main body of the insert member is covered with the weather strip main body made of rubber or a resin provided with a rubbery elastic body inside the metal mold, needless to say, the introduction through holes and the through grooves are not covered. For this reason, at the outer perimeters of the introduction through holes and the through grooves, the elastic material on the obverse surface side and the elastic material on the reverse surface side are separated from each other, so that there is a possibility that the elastic material comes off from the insert member.

In the weather strip embedded with the insert member as shown in Japanese Laid-Open Patent Publication No. H07-266879, there is also a possibility that the elastic material comes off from the insert member because the elastic material on the obverse surface side of the weather strip and the elastic material on the reverse surface side thereof are separated from each other among the at least three small projections of the clip hole of the insert member.

Moreover, when general-purpose clips of a type where the distance between the head portion and the locking portion is small are used as the clips for attaching the weather strip to the automobile body such as the door panel for the commonalization of parts, although it is necessary that the parts of the weather strip to which clips are attached be all equal in thickness, the part embedded with the insert portion is large in thickness. Therefore, it is necessary to suppress the increase in the thickness of the part by reducing the thickness of the elastic material at the perimeter of the through hole for clip insertion in the part embedded with the insert member. However, when this is done, since the elastic material part around the through hole for clip insertion is thin, another problem occurs in that when the clip is inserted into the through hole, the elastic material part readily rips because of the interference between the clip and the elastic material.

To solve these problems, it is considered to provide a plurality of small-diameter through holes as described above also around the clip through holes of the insert member to thereby unite the elastic material on the obverse side of the insert member and the elastic material on the reverse side thereof together through the through holes. By doing this, the thickness of the elastic material at the parts of the through holes increases, so that the clip attachment parts of the weather strip can be reinforced to thereby prevent the rip of the parts. However, when this is done, since the distance between the clip through holes and the small-diameter through holes is short, there is a possibility that the insert member breaks therebetween, so that the stiffness of the insert member cannot be made sufficient.

The present disclosure is made in view of the above-mentioned problem, and an object thereof is to make it possible to suppress the reduction in the stiffness of the insert member when the insert member is embedded in the corner portion of the weather strip and prevent the rip of the weather strip due to the interference with the clips when the weather strip is attached to the automobile body by the clips.

SUMMARY OF INVENTION

To attain the above-mentioned object, in one aspect of the present invention, an additional hole communicating with a clip hole of an insert member is formed at the clip hole.

Specifically, a weather strip according to one aspect of the present invention is a weather strip in which an insert member having a plurality of through holes is embedded in a corner portion of the weather strip made of an elastic material, in the corner portion, a clip insertion hole is formed in which a clip for attaching the corner portion to the automobile body is insertable, in the insert member, a clip hole is formed in a position corresponding to the clip insertion hole, in an outer peripheral portion of the clip hole formed in the insert member, an additional hole communicating with the clip hole is formed, and elastic materials of which the corner portion is made and that are situated on the obverse and reverse sides of the insert member are united together through the additional hole.

In the weather strip according to one aspect of the present invention, the additional hole communicating with the clip hole is formed in the outer peripheral portion of the clip hole formed in the insert member, and the materials of which the corner portion is made and that are situated on the obverse and reverse sides of the insert member are united together through the additional hole. That is, since the elastic materials on the obverse and reverse sides of the insert member can unite together through the additional hole in the outer peripheral portion of the clip insertion hole, the thickness can be partially increased and the stiffness of the outer peripheral portion can be improved. Consequently, the coming-off of the elastic material of the weather strip (outer peripheral portion) due to the interference with the clip can be prevented at the time of attachment to the automobile body by the clip. Further, in the weather strip according to one aspect of the present invention, since the additional hole communicates with the clip hole, the breakage of the insert member never occurs between the additional hole and the clip hole, so that the reduction in the stiffness of the insert member can be prevented.

In the weather strip according to one aspect of the present invention, preferably, the clip hole of the insert member is larger in diameter than the clip insertion hole of the corner portion.

By doing this, the elastic materials on the obverse and reverse sides of the insert member can be united together so as to adjoin the additional hole also in the part adjacent to the additional hole provided at the clip hole, in other words, in the area from the inner peripheral surface of the clip insertion hole of the corner portion to the inner peripheral surface of the clip hole of the insert member, so that the overall thickness can be increased and the stiffness on the inner peripheral side of the clip insertion hole can be improved. As a result, at the time of the attachment to the automobile body by the clip, the coming-off of the elastic material (of the inner peripheral portion) of the weather strip due to the interference with the clip can be more prevented.

In the weather strip according to one aspect of the present invention, preferably, the additional hole has an elongated shape whose width is smaller than the diameter of each of the through holes.

By doing this, the opening area of the insert member can be suppressed, so that the reduction in the stiffness of the insert member can be suppressed and the clip can be prevented from readily coming off when the weather strip is transported with the clip temporarily fixed to the clip insertion hole of the weather strip.

In the weather strip according to one aspect of the present invention, preferably, on the outer peripheral portion of the clip insertion hole formed in the corner portion, a thin portion thinner than the remaining part of the corner portion is provided.

According to the weather strip of one aspect of the present invention, since the thin portion thinner than the remaining part of the corner portion is provided on the outer peripheral portion of the clip insertion hole in the corner portion embedded with the insert member, the increase in the overall thickness of the part can be suppressed so that the thickness is equal to or smaller than the thickness of the outer peripheral portion of the clip insertion hole in the portion other than the corner portion. For this reason, even in the corner portion embedded with the insert member, general-purpose clips can be used as in the remaining portion, so that parts can be commonalized to prevent the increase in the part cost.

In the weather strip according to one aspect of the present invention, preferably, the additional hole extends up to the outside of an area corresponding to the thin portion.

By doing this, the area increases where the elastic materials on the obverse and reverse sides of the insert member can unite together through the additional hole in the thin portion, and further, the elastic materials can also unite with the large-thickness part situated outside the thin portion. For this reason, the stiffness of the thin portion can be improved, so that the effect of preventing the rip of the part can be improved.

According to the weather strip of one aspect of the present invention, the reduction in the stiffness of the insert member can be suppressed, and when the weather strip is attached to the automobile body by the clip, the coming-off of the elastic material of the weather strip due to the interference with the clip can be prevented and a rip can be prevented. In addition, general-purpose clips of a type where the distance between the head portion and the locking portion of the clip is small can be used to achieve cost reduction, and the coming-off of the clip during the transportation of the weather strip can be prevented.

BRIEF DESCRIPTION OF DRAWINGS

FIG. 1 is a view showing the right side of an automobile.

FIG. 2 is a view showing an automobile interior side view of a weather strip according to an embodiment of the present invention.

FIG. 3 is a view showing an automobile interior side view of an insert member embedded in the weather strip according to the embodiment of the present invention.

FIG. 4 is a cross-sectional view showing a condition where the weather strip according to the embodiment of the present invention is attached to the automobile body by use of a clip.

FIGS. 5A and 5B are enlarged cross-sectional views showing a condition where the weather strip according to the embodiment of the present invention is attached to the automobile body by use of the clip, FIG. 5A is a cross-sectional view corresponding to the part indicated by the line A-A of FIG. 3, and FIG. 5B is a cross-sectional view corresponding to the part indicated by the line B-B of FIG. 3.

DETAILED DESCRIPTION

Hereinafter, a mode for carrying out the present disclosure will be described based on the drawings. The following description of a preferred embodiment is, essentially, merely illustrative and does not intend to limit the present disclosure, application methods thereof or uses thereof.

A weather strip according to an embodiment of the present invention will be described with reference to FIGS. 1 to 5A and 5B.

In an automobile shown in FIG. 1, reference numeral 10 represents an automobile body, reference numeral 20 represents a (front side) door, and reference numeral 30 represents a weather strip provided on the peripheral edge of the door 20.

FIG. 2 is a view showing an automobile interior side view of the weather strip 30, particularly, showing a part attached to a corner portion at the peripheral edge of the door 20. As shown in FIG. 2, the weather strip 30 according to the present embodiment includes a weather strip main body 50 and a later-described insert member 60 embedded in the weather strip main body 50.

The weather strip main body 50 includes straight portions 51 attached to the substantially straight portions of the door 20 and formed by extrusion molding and a corner portion 52 attached to the corner portion of the door 20 and formed by molding with a metal mold. As shown in FIG. 2, the corner portion 52 is provided with a clip insertion hole 53 structured so that a clip for attachment to the peripheral edge of the door 20 can pass therethrough. After the corner portion 52 is formed by molding with a metal mold, the end portion of the straight portion 51 on the upper side of the automobile and the end portion of the straight portion 51 on the lower side of the automobile are set in a non-illustrated metal mold and an elastic material such as rubber or a resin is infused or injected into a metal mold cavity portion, whereby the shape of the corner portion 52 is formed and at the same time, the straight portions 51 and the corner portion 52 are united together at an upper side border line K1 and a lower side border line K2 inside the metal mold.

At this time, in the cavity portion of the metal mold, the insert member 60 is disposed that is made of a hard resin material having a lower extension performance than the elastic material such as rubber or a resin of which the weather strip main body 50 is made. Thereafter, the elastic material such as rubber or a resin for forming the corner portion 52 of the weather strip main body 50 is introduced into the metal mold, whereby the corner portion 52 is formed and the insert member 60 is embedded in the corner portion 52. Thereby, the corner portion 52 of the weather strip main body 50 is completed. Although the material used for the straight portions (extruded portions) 51 and the corner portion (molded portion) 52 of the weather strip main body 50 is not specifically limited, in the case of rubber, it is common to use EPDM sponge rubber (with a specific gravity of approximately 0.4 to 0.6) and in the case of a resin, it is common to use a thermoplastic elastomer (TPE) such as TPO. Moreover, although the hard resin material used for the insert member 60 is not specifically limited, either, resin materials mixed with a reinforcement material, for example, PP (polypropylene) containing talc and PA (polyamide) containing glass fibers are cited.

As shown in FIG. 3, the insert member 60 is provided with a plurality of small-diameter through holes 61 for preventing coming-off from the corner portion 52. As described above, since these through holes 61 enables the elastic material on the obverse surface side and the elastic material on the reverse surface side in the part of the corner portion 52 embedded with the insert member 60 to unite together through the through holes 61, the insert member 60 can be prevented from coming off inside the corner portion 52. To obtain such an effect, it is considered to provide the small-diameter through holes 61 in the neighborhood of a clip hole 62 (the area of reference numeral 64 in FIG. 3); however, when this is done, the distance between the through holes 61 and the clip hole 62 is extremely short, so that there is a possibility that the stiffness of this part decreases to cause breakage. However, in the present disclosure, since additional holes 63 are provided so as to communicate with the clip hole 62, the breakage of the insert member 60 never occurs between the additional holes 63 and the clip hole 62. Therefore, in the weather strip of the present embodiment, reduction in the stiffness of the insert member can be suppressed. By providing such additional holes 63, the elastic materials situated on the obverse and reverse sides of the insert member 60 are connected together through the additional holes 63. That is, as shown in FIG. 5B, since the elastic materials on the obverse and reverse sides of the insert member 60 can unite together through the additional holes 63 at the outer peripheral portion of the clip hole 62, the outer peripheral portion of the clip hole 62 can be reinforced and thickened at this portion and the stiffness can be improved (L3 in FIG. 5B). As a result, the above-described coming-off of the elastic material at the outer peripheral portion of the clip hole 62 due to the interference between a clip 70 and the outer peripheral portion of the clip hole 62 can be prevented.

Moreover, the insert member 60 is provided with the clip hole 62 having a larger diameter than the clip insertion hole 53 in a position corresponding to the clip insertion hole 53 when embedded in the corner portion 52. Thereby, the clip insertion hole 53 of the weather strip main body 50 and the clip hole 62 of the insert member 60 communicate with each other, so that the corner portion 52 of the weather strip 30 can be attached to the door 20 by the clip passing therethrough to be inserted also into a clip attachment hole further provided on the door 20. By making the diameter of the clip hole 62 larger than that of the clip insertion hole 53, the elastic materials on the obverse and reverse sides of the insert member 60 can be united together also in the part adjacent to the additional holes 63 provided at the clip hole 62, in other words, in the area from the inner peripheral surface of the clip insertion hole 53 to the inner peripheral surface of the clip hole 62, so that the overall thickness can be increased and the stiffness on the inner peripheral side of the clip insertion hole 53 can be improved. As a result, at the time of the attachment to the automobile body by the clip 70, the coming-off of the elastic material (of the inner peripheral portion) of the weather strip 30 due to the interference with the clip 70 can be prevented more.

A mode in which the corner portion 52 of the weather strip 30 in the present embodiment is attached to the door 20 will be described with reference to FIG. 4. As shown in FIG. 4, the corner portion 52 of the weather strip 30 is attached and fixed to the door 20 by the clip 70. Specifically, the clip 70 has a leg portion 71 inserted in the clip insertion hole 53 of the weather strip main body 50, the clip hole 62 of the insert member 60 and the attachment hole 21 provided on the door 20 and a head portion 72 having a diameter larger than those of the clip insertion hole 53 and the clip hole 62. The leg portion 71 vertically extends from the reverse surface of the head portion 72, and at the tip side of the leg portion 71, a diameter-enlarged locking portion 73 is formed. Moreover, the leg portion 71 is provided with a hollow portion 74 so as to be elastically deformable. When the clip 70 is pre-assembled to the weather strip 30, the leg portion 71 of the clip 70 is inserted into the clip insertion hole 53 and the clip hole 62 and temporarily locked. Then, when the weather strip 30 is attached to the door 20, the locking portion 73 of the leg portion 71 is engaged with the outer peripheral portion of the attachment hole 21 of the door 20. As a consequence, the weather strip main body 50 embedded with the insert member 60 and the door 20 are sandwiched between the head portion 72 and the locking portion 73 of the clip 70 and the weather strip main body 50 is fixed to the door 20. Although not shown, the diameters of the clip insertion hole 53 of the corner portion 52 and the clip hole 62 of the insert member 60 may be the same.

As shown in FIG. 3, the additional hole 63 is a slit-like (elongated) through hole formed so as to extend from the clip hole 62 in a predetermined direction along the surface of the insert member 60. While two additional holes 63 are provided in the present embodiment, the number is not specifically limited.

Moreover, while the size of the width of the additional holes 63 is not specifically limited in the present embodiment, it is preferable that the width be smaller than the diameter of each of the small-diameter through holes 61. By doing this, the increase in the opening area of the insert member 60 can be suppressed, so that the reduction in the stiffness of the insert member 60 can be suppressed and the clip 70 can be prevented from readily coming off when the weather strip 30 is transported with the clip 70 temporarily fixed to the clip insertion hole 53 of the weather strip main body 50.

In the present embodiment, a thin portion 54 formed so as to be thinner than the remaining part of the corner portion 52 is disposed on the outer peripheral portion of the clip insertion hole 53. The thin portion 54 is provided to enable the use of a general-purpose clip as described later. However, although not shown, the thin portion may be not provided.

When a general-purpose clip is used, since the distance from the head portion 72 to the locking portion 73 of the clip 70 is predetermined (L1 in FIG. 5A), it is necessary that the total thickness of the weather strip main body 50 and the door 20 at the part where the clips 70 is attached be not more than the dimension L1. For this reason, the thickness cannot be made large at the attachment portion of the clip head portion 72 in the part embedded with the insert member 60 and therefore, the thin portion 54 is provided on the outer peripheral portion of the clip insertion hole 53 of the weather strip main body 50. When the thin portion 54 is provided, since the distance from the head portion 72 of the clip 70 and the surface of the insert member 60 is short and thin on the outer peripheral portion of the clip hole 62 of the insert member 60 (L2 in FIG. 5A), there is a possibility that the thin portion 54 rips due to the interference such as rubbing between the clip 70 and the thin portion 54 at the time of insertion of the clip 70. To prevent this, in the present embodiment, the additional holes 63 communicating with the clip hole 62 are provided in the insert member 60.

In the present embodiment, although the length of the additional holes 63 is not specifically limited, it is preferable that the additional holes 63 extend up to the outside of the position corresponding to the thin portion 54 provided on the weather strip main body 50 (the area of reference numeral 64 in FIG. 3). By doing this, the area increases where the elastic materials on the obverse and reverse sides of the insert member 60 can unite together through the additional holes 63 as described above, and further, the elastic materials can also unite with the large-thickness part situated outside the thin portion 54. For this reason, the effect of preventing the rip of the part can be improved.

While a weather strip attached to the neighborhood of the front side beltline BL of the front door is illustrated and described in the present embodiment, the present disclosure is not limited thereto. The present disclosure is applicable not only to the weather strip for door attachment but also to a weather strip for body attachment. Further, the present disclosure is applicable to all kinds of weather strips where an insert member is embedded in a molded portion and then, a clip is passed through a through hole of the insert member for attachment.

The invention claimed is:

1. A weather strip in which an insert member having a plurality of through holes is embedded in a corner portion of the weather strip made of an elastic material,
    wherein in the corner portion, a clip insertion hole is formed in which a clip for attaching the corner portion to an automobile body is insertable, the clip includes a head portion, a leg portion vertically extending from the head portion, and a locking portion formed at a tip side of the leg portion,
    in the insert member, a clip hole is formed in a position corresponding to the clip insertion hole,
    in an outer peripheral portion of the clip hole formed in the insert member, an additional hole communicating with the clip hole is formed,
    elastic materials of which the corner portion is made and that are situated on obverse and reverse sides of the insert member are united together through the additional hole,
    in an outer peripheral portion of the clip insertion hole formed in the corner portion, a clip head attachment portion to be abutted to the head portion of the clip,
    a thickness of the clip head attachment portion is the smallest in the corner portion embedded with the insert member.

2. The weather strip according to claim 1, wherein the clip hole of the insert member is larger in diameter than the clip insertion hole of the corner portion.

3. The weather strip according to claim 1, wherein the additional hole has an elongated shape whose width is smaller than a diameter of each of the through holes.

4. The weather strip according to claim 1, wherein the additional hole extends up to an outside of an area corresponding to the clip head attachment portion.

* * * * *